UNITED STATES PATENT OFFICE.

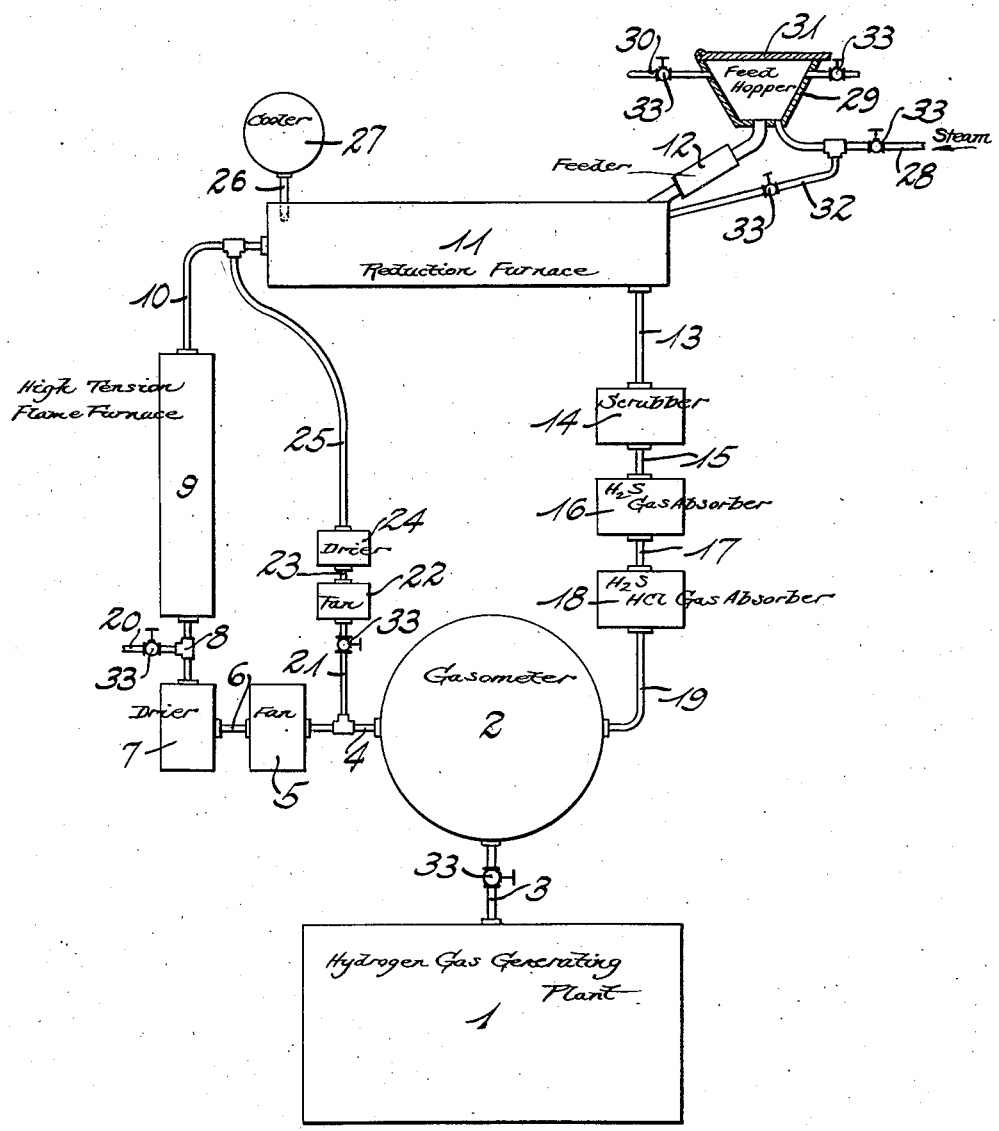

SIGURD WESTBERG, OF CHRISTIANIA, NORWAY.

REDUCTION PROCESS.

1,310,724.                 Specification of Letters Patent.       Patented July 22, 1919.

Application filed October 22, 1917.    Serial No. 197,818.

*To all whom it may concern:*

Be it known that I, SIGURD WESTBERG, a subject of the King of Norway, residing at Christiania, Norway, have invented certain new and useful Improvements in Reduction Processes, of which the following is a specification.

This invention relates to the reduction of the oxids, chlorids and oxychlorids of tungsten and molybdenum, and of the oxids of iron, by use of hydrogen gas as a reducing agent.

The object of the invention is to provide a process capable of being economically worked on a large manufacturing scale for obtainment of fine metals of the kinds stated.

In the accompanying diagram forming a part hereof, and illustrating the principle of this invention in what I now deem the best of several varying modes now known to me, 1 indicates any practical kind of hydrogen-gas generating plant, and 2 a gasometer into which the gas is passed from the plant through a conduit 3. From the gasometer a conduit 4 leads through a fan-containing structure 5 which is connected by an eduction pipe 6 to a receptacle 7 in which moisture in the gas is eliminated as far as practicable; the receptacle being provided with calcium chlorid, $CCl_2$ or other moisture-absorbing agent with which the gas comes in contact. The fan forces the dry gas from the receptacle 7 under sufficient pressure to cause it to flow through the conduit 8 which leads from receptacle 7 into a high-tension flame furnace 9 through which the fan pressure causes the gas, which is highly heated in the high-tension flame furnace, to flow onward in a continuous course into and through the conduit 10 which leads from the high-tension flame furnace into the reduction furnace 11 that may be of any suitable construction.

High-tension flame furnaces of several types are now known: the Birkeland & Eyde; the Schoenherr; the Pauling; the Scott; and the Rankin. These are among those frequently described in works on chemical engineering. The general characteristic of a high-tension flame furnace is its high voltage, the flame in some being extinguished by stabilization with either air or gas, and in others being stabilized by a magnetic field. By stabilization is meant that the flame is drawn out or prolonged in various shapes from the electrodes at which the flame is initially produced. In a high-tension flame furnace, when used for the purpose of this invention, the gas temperature may be easily regulated by the secondary flow of cooler gas from the gasometer through the fan 22 and drier 24 to the reduction furnace, this secondary gas being cooler than the reduction gas coming from the high-tension flame furnace.

The ore or compound to be reduced is fed continuously into the reduction furnace, not requiring any heater, by a suitable feeder 12 entrant at a part of the reduction furnace opposed to the entrance of the gas so that, as usual, the metal to be reduced and the reducing gas travel in contact and in opposite directions.

The purpose and effect of preheating the volume of dry reducing-gas flowing from the high-tension reduction furnace, are conveniently and efficiently to raise the gas to a high temperature, varying from say 600° C. to 1300° C. before introducing it into the reduction furnace. By putting the gas at a regulated temperature such as described, into the reduction furnace, the temperature in the reduction furnace can be regulated so as to avoid danger of any injurious overheating of the metal therein during the reduction step. The reduction furnace heat as provided by its heating means, not shown, will be necessarily reduced in consequence of some absorption of such heat by the compound to be reduced; and by continuously supplying the reduction furnace with the preheated gas at a regulated temperature, the gas operative on the metal in the reduction furnace can be kept at any desired necessary temperature and the overheating avoided. For example, by reducing tungstic acid at a temperature of about 1300° C. sintering is avoided. But if the temperature be substantially above 1300° C., sintering will occur. In the reduction furnace the metal W, or Mo, or Fe, as the case may be, is liberated. If oxids are reduced, $H_2O$ vapor will be simultaneously evolved; if sulfids are reduced, $H_2S$ gas will be simultaneously evolved; and if chlorids are reduced, HCl gas will be evolved.

From the reduction furnace a conduit 13 leads into a scrubber 14 into which the reducing gas flows, still under pressure, from the fan, and wherein part of the steam $H_2O$ formed in the reduction step will be condensed and the gas HCl or $H_2S$ will be absorbed to a great extent. The scrubber, as usual, is provided with flowing water and a filling material of coke, for example, in order to obtain a large contact surface for the gas. Eventually some dust will be precipitated in the scrubber.

From the scrubber the reducing gas is forced by the fan pressure through the conduit 15 into a receptacle 16 containing an iron oxid or equivalent mass for absorbing the residual $H_2S$ gas which has not been absorbed by the water in the scrubber. From the receptacle 16 a conduit 17 leads to a tower 18 into which any residual HCl gas, or by possibility $H_2S$ gas, will escape and be eliminated by contact therein with any suitable absorbent, such for example as an alkali solution. A conduit 19 leads from the tower 18 back into the gasometer into which the cleansed reducing gas flows as a current which is established and maintained through the communicating chambers of the structures and conduits mentioned, by the pressure of the fan in structure 5. In the course of its flow and use some portion of the volume of reducing gas initially forced from the gasometer through the system will be lost, and the deficiency is replenishable from the generating plant.

The foregoing steps are sufficient for the reduction of tungsten oxids, chlorids, and oxychlorids or sulfids; and also when iron oxids are to be reduced; but are not sufficient when the suboxid of any of such three metals is to be produced.

If such suboxids are to be produced, then in each case, instead of drying the reducing gas before introducing it into the high-tension flame furnace, I add a certain amount of $H_2O$ vapor by introducing for example dry steam into the gas through the steam pipe 20, such pipe being shown in communication with the gas conduit 8 leading into the high-tension flame furnace.

In the case of the production of suboxids, I also prefer to regulate the temperature in the reduction furnace by admission of cool gas, preferably from the gasometer, and to this end I provide the conduit 4 with a branch conduit 21 which communicates with a fan-containing structure 22 for forcing the gas toward the reduction furnace, such cool gas passing from the fan structure 22 through the conduit 23 into an absorber 24, and thence through the conduit 25 into communication with the conduit 10 which leads from the high-tension flame furnace into the reducing furnace.

In any event the reduced material, after its reduction, is to be cooled immediately and out of exposure to atmospheric air; and the best way of effecting such cooling is to discharge the reduced metal from the reduction furnace through the discharge conduit 26 thereof into an oil-containing receptacle 27. The reduced material gravitates in the oil, which serves as a cooling medium to prevent oxidation of the metal. After the reduced material has been thus cooled in the oil or other suitable cooling medium, the reduced material is removed, and in its cool state is not subject to oxidation in the air. In the cooling step the temperature of the cooling medium, which is preferably but not necessarily oil, is to be kept below the ignition point of the pyrophoric product of the reduction step. The ignition point of such pyrophoric tungsten metal is about 200° C., of such pyrophoric molybdenum metal about 200° C., and of such pyrophoric iron metal, approximately from 150° to 160° C.

The point is to cool such a pyrophoric metal of the reduction step in a cooling medium having a temperature less than the ignition of the pyrophoric metal, before such metal is exposed to the air as a commercial product, in order to prevent subsequent oxidation thereof.

In all cases under my process it is necessary so far as possible, to exclude air from the reduction system. In the feed-in operation of the metal to be reduced, some air would necessarily be admitted unless some effective means of preventing the admission of air were used. The reason for excluding air from the system is to prevent admixture of hydrogen and oxygen whereby an explosive mixture might result. Another reason for excluding air is to prevent the introduction of $H_2O$ into the system. To prevent the admission of air with the charge, a steam jet 28 may discharge into the bottom of the covered hopper 29 of the feeder 12, and flow out through the escape pipe 30 leading from the upper part of the covered hopper. The cover is indicated by 31. In this way air contained in the hopper with the charge can be exhausted from the hopper. Any other suitable way of excluding outside air may be used, such for example as causing a part of the reducing gas to flow out through the hopper and carry with it the air contained in the hopper. Thus a part of the gas in the reducing furnace may be led into the bottom of the hopper through the conduit 32 as shown in connection with the reduction furnace and the conduit 28, and flow out through the said escape pipe 30.

Any other air-excluding medium may be used to exclude air from the charge before it is delivered into the reduction furnace.

When the apparatus is first started, the air in the system is excluded by the hydrogen gas current, the vent valve 33 being provided as shown in the hopper.

Suitable shut-off and regulating valves 33 are shown in the diagram and may of course be used wherever required or convenient.

If the hydrogen plant 1 is one which produces a mixture of hydrogen and nitrogen, then it will be important to discharge the same volume of nitrogen from the system as enters it from the plant or gasometer, to prevent accumulation of nitrogen in the system. Nitrogen unduly accumulated therein would not be useful in the reduction step, and the hydrogen would be used leaving finally a non-useful volume of nitrogen gas in the system. It would however, because hydrogen-nitrogen producing plants are more economical than mere hydrogen producing plants, be desirable to use a hydrogen-nitrogen plant 1 rather than a mere hydrogen-producing plant; and to have as high a percentage of nitrogen gas as possible in the circulating current of reducing gas is economically desirable because the loss of hydrogen gas may be minimized, for if there be leaks in the system the percentage of hydrogen gas lost by such leaks will be less in the case of a hydrogen-nitrogen mixture than it would be in the case of a mere hydrogen gas. The hydrogen-nitrogen gas can be used for metallurgical purposes without interfering with the reduction of the metal and without injuring its quality. By keeping the valve 33, in the escape pipe 30 of the hopper, properly open and opening the valve 33 in the conduit 32 and closing off the valve 33 in the conduit 28, the same quantity of nitrogen will flow out through the hopper as is let into the system from the plant or gasometer, but with some loss of hydrogen. Nitrogen gas, unless allowed to escape, will accumulate in the system and such accumulation of nitrogen gas in the system would replace some hydrogen gas to such an extent as to impair the reduction process. Regulation of the valves as described,—that is regulation of the valve 33 in the escape pipe 30, and of the valve 33 in the conduit 32, with the valve 33 in the steam-jet pipe 28 closed,—serves to let out more or less nitrogen gas according to the extent of their opening, such nitrogen gas escape being dependent on both the static and dynamic pressure in the system. The hydrogen-nitrogen mixture from the gasometer may vary in the ratio of its constituents, and the valve 33 in the conduits 30 and 32 when the valve of the steam jet conduit is closed, may be regulated in order to maintain the desired ratio between the nitrogen and the hydrogen in the circulating volume of reduction gas. The escaping gases will serve to drive the air in the incoming charge out of the hopper.

Striking advantages of my process are: It involves a continuous reduction, under very definite regulation of the reduction temperature, and of the character of the reduction gas or gas concentration. It involves an effective cooling of the reduced metal prior to removal thereof, so that it will not oxidize in contact with air after removal. It involves an economic utilization of the reducing agents and permits the use of a relatively cheap hydrogen-nitrogen reducing-gas mixture whereby the loss of hydrogen gas is minimized, and by its use a circulation of hydrogenous reducing gas, practically free from oxygen, is obtained. And by preheating the reducing gas in a high-tension flame furnace, of which several forms are well known, prior to the introduction of the reducing gas into the reduction furnace which need have no heater, the construction of the reduction furnace may be greatly economized.

What I claim is:

The process of continuously reducing reducible metallic material consisting in subjecting it to a current of preheated hydrogenous gas; in regulating the temperature of such current by the introduction of a relatively cool hydrogenous gas; and in cooling the reduced metal in exclusion from an oxidizing agent.

In testimony whereof I have hereunto set my hand this 18th day of October, 1917.

SIGURD WESTBERG.